US010055221B2

(12) United States Patent
Grant

(10) Patent No.: US 10,055,221 B2
(45) Date of Patent: Aug. 21, 2018

(54) METHOD AND APPARATUS FOR GENERATING A PROFILE OF A TARGET PROGRAM

(71) Applicant: ARM LIMITED, Cambridge (GB)

(72) Inventor: Alasdair Grant, Cambridge (GB)

(73) Assignee: ARM Limited, Cambridge (GB)

( * ) Notice: Subject to any disclaimer, the term of this patent is extended or adjusted under 35 U.S.C. 154(b) by 21 days.

(21) Appl. No.: 15/235,432

(22) Filed: Aug. 12, 2016

(65) Prior Publication Data

US 2017/0075685 A1 Mar. 16, 2017

(30) Foreign Application Priority Data

Sep. 16, 2015 (EP) .................................. 15185433

(51) Int. Cl.
| | | |
|---|---|---|
| *G06F 9/45* | (2006.01) | |
| *G06F 8/70* | (2018.01) | |
| *G06F 11/34* | (2006.01) | |
| *G06F 11/30* | (2006.01) | |
| *G06F 8/75* | (2018.01) | |

(52) U.S. Cl.
CPC ............ *G06F 8/70* (2013.01); *G06F 11/3072* (2013.01); *G06F 11/3466* (2013.01); *G06F 8/75* (2013.01)

(58) Field of Classification Search
None
See application file for complete search history.

(56) References Cited

U.S. PATENT DOCUMENTS

| 5,732,273 A | 3/1998 | Srivastava et al. |
| 6,126,329 A | 10/2000 | Bennett et al. |
| 2006/0190930 A1 | 8/2006 | Hecht et al. |
| 2011/0138363 A1* | 6/2011 | Schmelter ........... G06F 11/3636 717/128 |

\* cited by examiner

*Primary Examiner* — Chuck Kendall
(74) *Attorney, Agent, or Firm* — Nixon & Vanderhye P.C.

(57) ABSTRACT

A method for generating a profile of a target program executed by a target data processing apparatus comprises performing at least one profile updating operation. Each profile updating operation includes identifying based on at least one waypoint marker indicating an outcome of a corresponding waypoint instruction of a target program, a next block of instructions executed by the target data processing apparatus during execution of the target program; determining whether a target entry for the next block of instructions is present in a profile cache; when the target entry is present updating the profile of the target program according to zero, one or more profile updating actions specified by the target entry. When the target entry is absent, any profile updating actions can be determined based on an instruction-by-instruction representation of the target program. This approach helps to speed up instruction-based summaries from program flow trace.

19 Claims, 8 Drawing Sheets

METHOD AND APPARATUS FOR GENERATING A PROFILE OF A TARGET PROGRAM

BACKGROUND

This application claims priority to EP Patent Application No. 15185433.8 filed 16 Sep. 2015, the entire contents of which is hereby incorporated by reference.

Technical Field

The present technique relates to the field of data processing. More particularly, it relates to a method apparatus for generating a profile of a target program.

Technical Background

A profile of a target program executed by a target data processing apparatus can be generated based on trace information captured during execution of the target program. For example, the profile could summarise the frequency of occurrence of various source-level program features such as functions, statements, or function calls, or could count execution of particular categories of instructions. This can be useful for software development since it can help identify issues arising when the target program is executed by a particular target data processing apparatus.

SUMMARY

At least some examples provide a method for generating a profile of a target program executed by a target data processing apparatus, based on trace information captured during execution of the target program by the target data processing apparatus;

the method comprising performing at least one profile updating operation, each profile updating operation comprising:

identifying, based on at least one waypoint marker of said trace information indicating an outcome of a corresponding waypoint instruction of the target program, a next block of instructions executed by the target data processing apparatus during execution of the target program;

determining whether a target entry corresponding to said next block of instructions is present in a profile cache, the target entry specifying zero, one or more profile updating actions associated with the next block of instructions; and when the target entry is present in the profile cache, updating the profile of the target program according to said zero, one or more profile updating actions specified by said target entry.

At least some examples provide an apparatus comprising:

trace receiving circuitry to receive trace information captured during execution of a target program by a target data processing apparatus; and profile generating circuitry to generate a profile of the target program by performing at least one profile updating operation, each profile updating operation comprising:

identifying, based on at least one waypoint marker of said trace information indicating an outcome of a corresponding waypoint instruction of the target program, a next block of instructions executed by the data processing apparatus during execution of the target program;

determining whether a target entry corresponding to said next block of instructions is present in a profile cache, the target entry specifying zero, one or more profile updating actions associated with the next block of instructions; and when the target entry is present in the profile cache, updating the profile of the target program according to said zero, one or more profile updating actions specified by said target entry.

At least one some examples provide a computer program which, when executed by a host data processing apparatus, controls the host data processing apparatus to perform the method described above.

Further aspects, features and advantages of the present technique will be apparent from the following description of examples, which is to be read in conjunction with the accompanying drawings.

DESCRIPTION OF EXAMPLES

Figure 1:
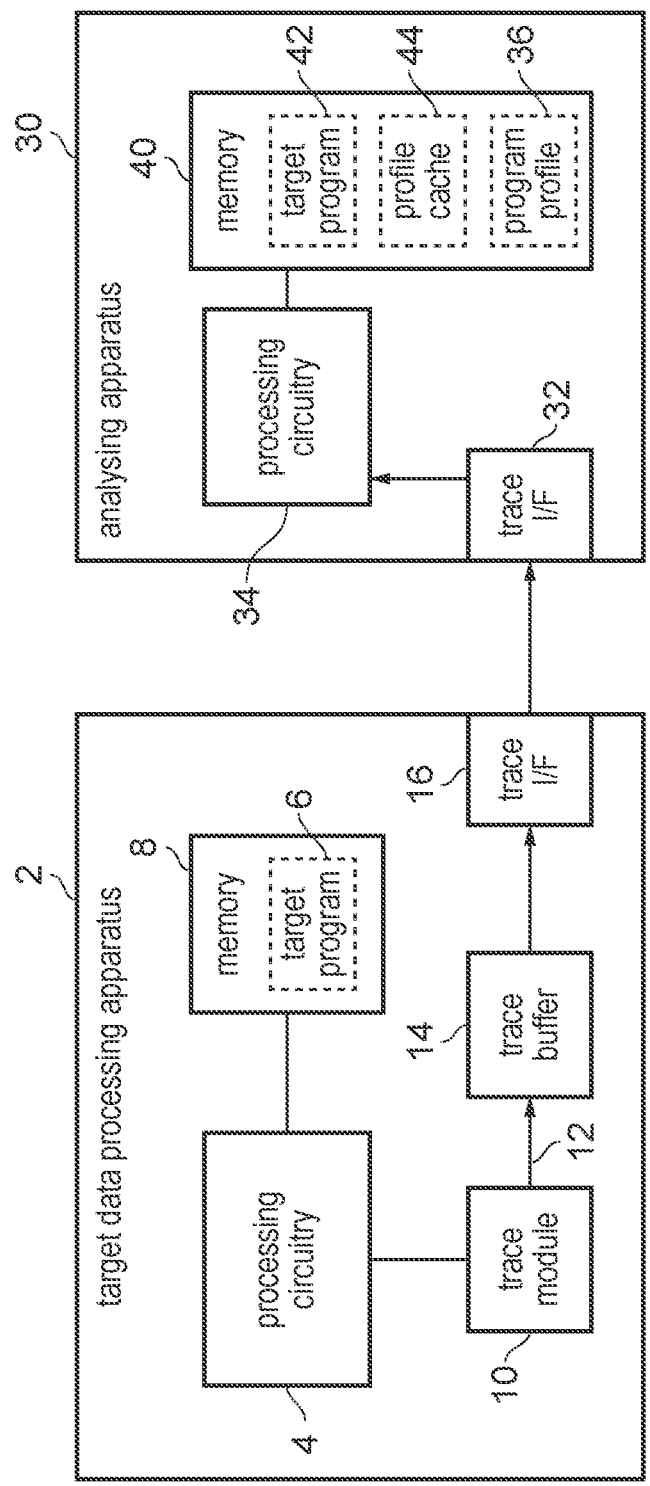
FIG. 1 schematically illustrates an example of a target data processing apparatus for executing a target program and an analysing apparatus for generating a profile of the target program.

Trace information captured during execution of a target program on the target data processing apparatus may include at least one waypoint marker for indicating an outcome of a corresponding waypoint instruction when executing the target program. In typical profile generating techniques, the waypoint markers are used to control stepping through an instruction-by-instruction representation of the target program to determine the frequency of occurrence of various events within the executed code, and generate the summary profile.

However, for many blocks of instructions within the program being executed, after expanding the waypoint markers into a full instruction-by-instruction representation and decoding each instruction, it may be found that those instructions do not require any updates to the profile. Hence, a relatively compact form of waypoint trace is expanded into a less efficient instruction-by-instruction representation, but only a subset of those instructions may contribute to the profile and possibly even none of the instructions may do. The trace stream is expanded significantly and then most of it may be discarded. This may be done multiple times for each iteration through a loop of executed instructions. This makes conventional profile generation techniques relatively slow.

Instead, the method of the present technique provides a profile cache with entries corresponding to blocks of instructions. The profile of the target program is established by performing a series of at least one profile updating operation. In each profile updating operation, a next block of instructions executed during execution of the target program is identified based on the waypoint markers of the trace information. It is determined whether a target entry corresponding to a next block of instructions is included in the profile cache. The target entry can specify zero, one or more profile updating actions associated with the next block of instructions. When the target entry is present in the profile cache, the profile of the target program is updated according to the zero, one or more profile updating actions specified by the target entry.

Hence, a profile cache may be used to remember sets of zero, one or more profile related actions triggered by particular blocks of instructions so that it is not necessary to access the instruction-by-instruction representation of the target program each time those instructions are encountered in the executed program as represented by the waypoint markers of the trace information. This is particularly useful since often the program being executed may include a number of loops where certain blocks of instructions are executed several times and so by avoiding the need to parse the target program instruction by instruction each time the loop is executed, the profile can be generated much faster.

On the other hand, when the target entry is absent in the profile cache, the instruction-by-instruction representation of the program instruction may be used to determine whether zero, one or more profile updating actions are required, and then the profile of a target program may be updated accordingly. Hence, the use of the instruction-by-instruction representation to determine any profile updating actions for the next block of instructions can be restricted to cases where there is no corresponding target entry in the profile cache (e.g. because the next block of instructions has not been encountered before).

In the case when the target entry is absent in the profile cache, then the at least one profile updating operation may also comprise allocating entry to the profile cache which specifies the zero, one or more profile updating actions which were determined for the next block of instructions based on the instruction-by-instruction representation of the target program. Hence, if there is not already an entry in the profile cache for the next block of instructions then the required profile updating actions are determined based on the instruction-by-instruction representation, and then an entry is allocated to the profile cache to store those actions so that if the same block of instructions is encountered later in the executed program then the same actions can be read from the cache without needing to step through each instruction of the target program individually.

Note that it is possible for some entries of the profile cache to specify zero profile updating actions for a given block of instructions. Depending on the types of events for which the profile is to be updated, for some blocks of instructions there may be no events of interest and so it may not be necessary for the profile of the target program to be updated following that block of instructions. It is in this case that the present technique is particularly useful since it can be determined based on the target entry in the profile cache that zero profile updating actions are required, thus avoiding the need to step through the instruction-by-instruction representation of the target program for the next block of instructions in order to determine that no profile updates are required. This saves the overhead of decoding each instruction individually.

In other words, when the target entry is present in the profile cache, the method may include determining whether the target entry specifies at least one profile updating action. When at least one profile updating action is specified by the target entry, then the profile is updated according to the at least one profile updating action specified. When the target entry specifies that there are zero profile updating actions for the next block of instructions, then the profile is not updated. Similarly, when the target entry is absent, the method may include determining whether any profile updating action is required based on the instruction-by-instruction representation of the target program, and then allocating an entry to the profile cache specifying whether any profile updating action is required, and if at least one profile updating action is required, identifying the at least one profile updating action.

In some cases the profile cache could be a dedicated cache memory provided in hardware for storing the entry specifying which profile updating actions are associated would give him blocks of instructions. However, in many cases a profile cache may simply be an array of data within a general purpose memory which may also store other information.

Each profile updating operation corresponds to a certain block of instructions of the target program. In some examples the division between the blocks of instructions considered in successive profile updating operations could be relatively arbitrary. For example, a certain fixed size block of instructions could be considered on each pass. However, one particularly efficient way of processing the profile generation may be for each profile updating operation to correspond to a block of instructions ending with a given waypoint instruction as indicated by the next waypoint marker of the trace information. Hence, each profile updating operation may comprise identifying the next waypoint marker not already considered in the previous profile updating operations, and then selecting as the next block of instructions a block of instructions of the target program ending with the waypoint instruction corresponding to that next waypoint marker. The waypoint instructions may be instructions for which there may be several alternative outcomes which affect which instructions are executed in the target program following the waypoint instruction, and so by splitting the program up at these points, the blocks of instructions for which entries are allocated in the profile cache may map better to blocks of instructions for which there is a repeating pattern in which profile updates are required each time the block is executed.

The waypoint markers of the trace information may typically indicate outcomes of corresponding waypoint instructions, but may not indicate the address of the next instruction to be executed following a waypoint instruction. The next instruction address can be determined from the instruction-by-instruction representation of the target program. However, this may require some decoding of instruction opcodes from the instruction-by-instruction representation, which may incur some overhead.

To save processing, each entry of the profile cache may in addition to any required profile updating actions also specify the next instruction address of the next instruction to be executed by the data processing apparatus following the corresponding waypoint instruction. Hence, when for a given profile updating operation the next block of instructions hits in the profile cache, in addition to any required profile updating actions the address of the next instruction to be executed can also be determined from the accessed profile cache entry, so that it is not necessary to access the instruction by instruction representation of the target program. In a subsequent profile updating operation, the next block of instructions can be determined as a block starting from the instruction having the next instruction address which was indicated in the target entry for the previous profile updating operation. This makes the profile generation method more efficient.

On the other hand, if for a given profile updating operation there is no target entry in the profile cache, then the required profile updating actions and the next instruction address can be determined from the instruction-by-instruction representation, but then saved to the profile cache so that if the same block of instructions are encountered later, then this overhead can be avoided.

In general the waypoint instructions may be any instructions for which there are several possible outcomes which may control program flow within the target program being traced. For example the waypoint instruction may be a branch instruction or a function return and the waypoint marker could indicate whether the outcome of the corresponding branch or function return is taken or not taken. Hence, the waypoint information output as trace information during execution of the target program may simply provide a map indicating at a relatively high level the waypoints taken through the target program when the target program was executed, and the profile generation method takes this trace information together with the instruction by instruction representation in order to generate a fuller profile summarising occurrence of various events (e.g. execution of particular categories of instructions for example). By using the profile cache in the way discussed above, the number of times when the instruction by instruction representation needs to be accessed can be reduced because after a given block of instructions has been encountered once in the stream of waypoint markers, then on subsequent occasions any updates to be performed can be read directly from the profile cache. By triggering profile actions directly based on the waypoint markers without needing to access the instruction-by-instruction representation, the overhead of expanding the waypoint markers into an instruction stream and decoding each instruction can be saved.

In some cases, separate profile cache entries may be provided for the same block of instructions but corresponding to different outcomes of the corresponding waypoint instructions. For example, one entry may specify zero, one or more profile updating actions to be performed for a given block of instructions when a waypoint instruction is taken, and another entry may specify alternative profile updating actions to be performed for the same block of instructions when the corresponding waypoint instruction is not taken.

Alternatively, a shared entry may be provided for a given block of instructions, irrespective of the outcome indicated by the waypoint marker for the corresponding waypoint instructions. The entry could specify at least one conditional profile updating action which is to be performed selectively depending on the outcome indicated by the waypoint marker for the corresponding waypoint instruction. This approach may save space in the profile cache.

To identify which profile cache entries correspond to which blocks of instructions, each entry may be tagged with a start address of the corresponding block of instructions. The end address of the corresponding block of instructions could be stored explicitly in the profile cache entry, or could be implicit as the address of the next waypoint instruction following the start address.

In each profile updating operation, having identified the next block of instructions, the method may include performing an address comparison for determining whether the start address for any entry of the profile cache matches the start address of the next block of instructions. If there is a match then the target entry is deemed to be present and if none of the entries match the start address of the next block of instructions then the target entry is considered to be absent. In general, the start address of the next block of instructions may be the address of the first instruction executed in the target program after the last instruction considered in the previous profile updating operation, which may often be a waypoint instruction. As mentioned above, the start address of the next block of instructions may in some cases be specified within the profile cache entry accessed in the previous profile updating operation.

This searching of the profile cache based on the start address incurs a certain overhead in comparing the start address of the next block of instructions with the start address in the tag of each profile cache entry. The cache lookup can be accelerated by having one entry of the cache chained directly to its successor entry representing a subsequently executed block of instructions. Hence, at least one entry of the profile cache may correspond to a first block of instructions and include a subsequent entry indication identifying a further entry of the profile cache which corresponds to a second block of instructions executed by the data processing apparatus following the first block of instructions. For a given profile updating operation, when the target entry is present in the profile cache and comprises the subsequent entry indication, then for a subsequent profile updating operation the address comparison can be performed only for the further entry which was indicated by the subsequent entry indication in the target entry for the given profile updating operation. When that address comparison determines that the start addresses match, then the address comparison for any other entry of the profile cache can be suppressed. The address comparisons for any other entry may only be performed if the address comparison for the further entry indicated by the subsequent entry indication does not match. It may be relatively common for several blocks of instructions to be executed in succession on several different occasions, when the outcomes of any intervening waypoint instructions are the same for several iterations of a loop. By identifying the next profile entry to be accessed in the previous profile entry, this avoids the need to perform a tag lookup for each entry of the cache.

Alternatively, or in addition, it is possible to merge two or more entries of the profile cache to form a single entry specifying profile updating actions to be performed for two or more blocks of instructions. For example, this can be useful when two or more blocks of instructions are executed consecutively on several occasions so that effectively they can be treated as a single block of instructions. In that case, merging the corresponding entries of the profile cache into a single entry frees up space in the cache for indicating profile updating actions for other blocks of instructions, and also allows the target program to be analysed more quickly since a single cache access provides the required updates for a larger block of instructions, allowing the program to be stepped through faster in fewer profile updating operations.

In general, a predetermined condition may be required to be satisfied before two or more entries are merged. For example, the predetermined condition may be detecting that a number of times when the corresponding blocks of instructions are executed consecutively is larger than a given threshold. For example, a storage structure may be maintained specifying, for each block of instructions having an entry in the cache, which block of instructions was executed next, and how often, and when a count of the number of times when a given block of instructions followed is more than a certain level, then the corresponding entries may be merged.

In systems which support merging of profile cache entries, for a given starting address there may be several candidate blocks of instructions which can be identified as the next block of instructions. For example, for a given start address a number of candidates corresponding to blocks extending to the first waypoint instruction, the second waypoint instruction, the third waypoint instruction, and so on up to a given number of subsequent waypoint instructions, and the cache could be looked up for each of those candidate blocks of instructions to determine whether there is a corresponding entry for any of the candidates.

The profile updating actions indicated for a given block of instructions may vary considerably depending on the purpose of the profiling. In some systems there may be a configuration register or control parameter which may control the types of profiling being performed. For example, the profile updating action may comprise updating the profile of the target program to indicate at least one property of an executed instruction, updating at least one count value indicating a number of occurrences of at least one predetermined event, updating at least one count value indicating a number of instructions of a given type that were executed, or updating the profile based on the result of processing the corresponding block of instructions with a prediction model such as a branch prediction model. It will be appreciated that the present technique can be applied to any type of profiling of a target program regardless of the particular type of information being collected in the profile.

The profiling method can be implemented in different ways. In some cases the method may be performed on a general purpose computer controlled by software. For example a computer program may be provided on a computer-readable storage medium which, when executed by a host processing apparatus controls the host to perform the method of generating the profile discussed above. The computer-readable storage medium may be a non-transitory medium. For example, the general purpose processor may receive the trace information captured by an on board trace module within the target data processing apparatus and then analyse the trace information to generate the profile target program.

Alternatively, the technique can be implemented in hardware using a dedicated circuit for receiving the trace information and generating the profile.

In some cases the method of generating a profile of the target program may take place in a separate apparatus from the target data processing apparatus which executed the target program.

In other cases the apparatus which generates the profile may be the target data processing apparatus itself, which may have on board circuitry for tracing the operation of the target processor and generating the profile based on the trace information. For example this can be useful for allowing the software executed by the target data processing apparatus to be recompiled or modified to address any issues determined from the profile.

FIG. 1 schematically illustrates an example system supporting profiling of an executed program. A target data processing apparatus 2 comprises processing circuitry 4 for executing program instructions of a target program 6 stored in a memory 8. It will be appreciated that in some cases the memory 8 may include a cache. It will be appreciated that the schematic diagram of the target data processing apparatus 2 is simplified, and the apparatus 2 may typically include many other elements not shown in FIG. 1. Any known design of target data processing apparatus could be used.

The target data processing apparatus 2 has a trace module 10 for monitoring the operation of the processing circuitry 4 during execution of the target program 6, and outputting a stream of trace data 12 providing information on the behaviour of the processing circuitry 4 during execution of the target program 6. For example the trace information 12 may allow the cycle-by-cycle address, data and control behaviour of the processing circuitry 4 to be determined. The trace information 12 may for example specify which instructions are executed by the processing circuitry, which data accesses to memory are performed, could identify the occurrence of certain events such as interrupts or certain mode changes of the processing circuitry 4, or could identify other types of information. The trace information is output to a trace buffer 14 for storing the trace information on-chip. A trace interface 16 is provided to allow an external apparatus to read the trace information from the trace buffer 14.

The size of the trace buffer 14 and the bandwidth on the trace interface 16 is typically limited and so it is often desirable for the trace module 10 to generate as little trace information as possible while still providing sufficient information to allow the behaviour of the processing circuitry 4 to be determined. One technique for reducing the amount of trace information is to provide program flow tracing, to output trace information relating to the outcome of waypoint instructions instead of outputting a record of each individual instruction executed by the processing circuitry 4.

Figure 2:
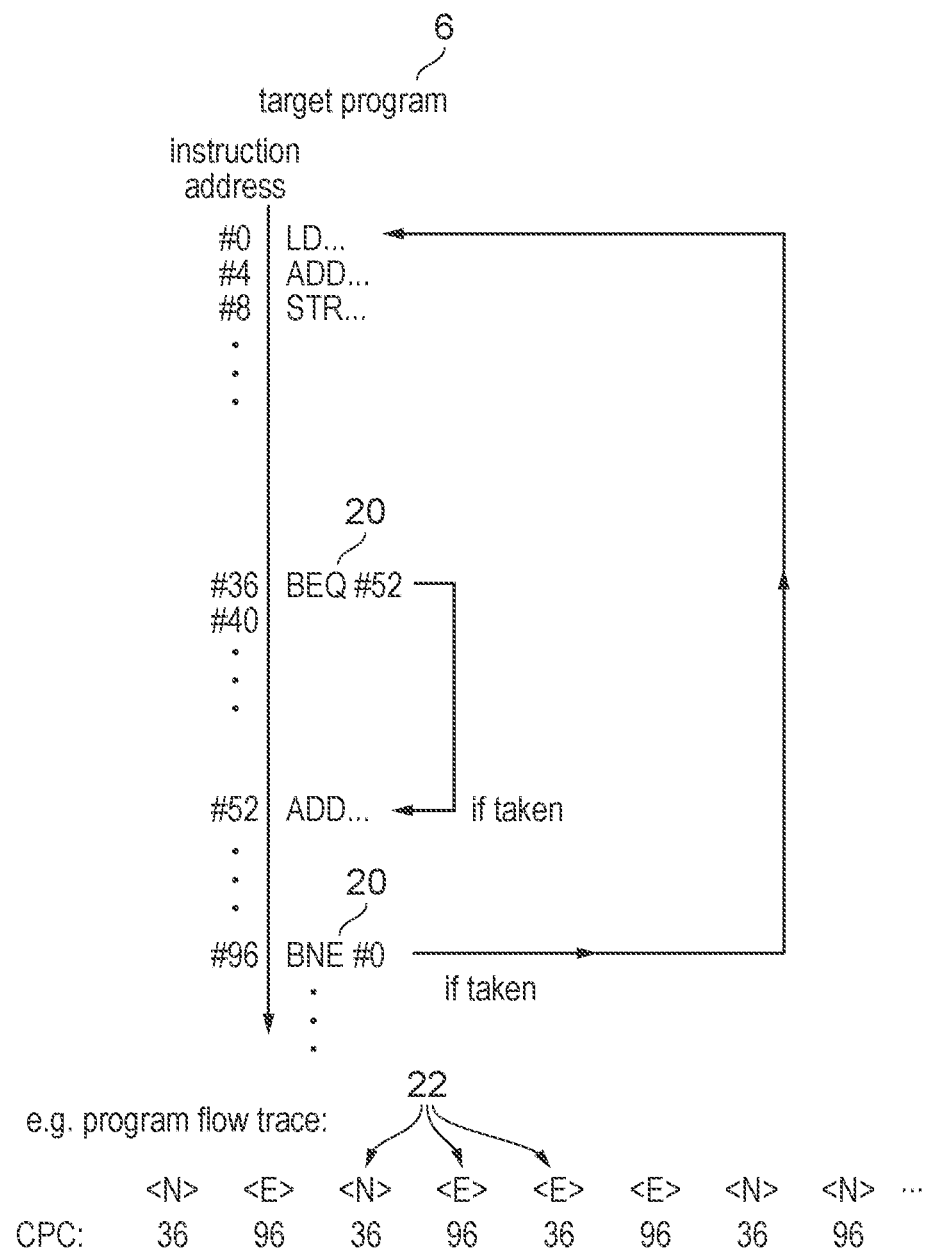
FIG. 2 shows an example of a target program to be executed and an example of trace information generated during execution of the target program.

FIG. 2 shows an example of a target program 6 which includes a number of conditional branch instructions 20 for redirecting program flow to a specified instruction address when a certain condition is satisfied. For example the condition may depend on the result of a previous instruction. In the example shown in FIG. 2, the branch instruction at address #36 branches to address #52 if an earlier result is equal (EQ) while the branch at instruction address #96 branches back to address #0 if an earlier result is not equal (NE). It will be appreciated that many other conditions could be provided. Also some branches may be unconditional in that they always branch to a given location.

In general, most of the instructions of the target program 6 may not be able to redirect program flow in this way. For example the arithmetic or load/store instructions shown at instruction addresses #0, #4, #8 simply carry out a corresponding operation and then program flow proceeds to the next instruction. The amount of trace data generated by the trace module 10 can be reduced by only generating trace information for one of the waypoint instructions 20 for which different outcomes of program flow are possible, rather than generating trace information for every executed instruction. Hence as shown in the bottom of FIG. 2, the program flow trace stream may include a number of trace atoms (waypoint markers) 22 each indicating the outcome of a given waypoint instruction 20. Each trace atom 22 could correspond to a separate trace packet or to a bit or set of bits within a given trace packet. For example a trace module 10 could monitor a series of waypoint instructions and then generate a single trace packet including a number of bits specifying the trace atoms 22 for the set of monitored waypoint instructions. While FIG. 2 shows branch instructions as the particular example of a waypoint instruction, other examples may include function returns.

Hence, the output of the trace module 10 may include a series of waypoint markers which identify the outcomes of corresponding waypoint instructions 20 in the executed target program 6. As shown in FIG. 2 there may be loops in the program and so certain blocks of instructions may be executed several times, and so on each iteration corresponding waypoint markers may be output to indicate whether the corresponding waypoint instructions were taken or not taken. In the notation used below, a waypoint marker <N> indicates that the corresponding waypoint was not taken, and a waypoint marker <E> indicates a taken waypoint instruction. It will be appreciated that there are many ways in which this information could be represented in binary form within the generated trace packets.

The trace information 12 is output to a trace interface 32 of an analysing apparatus 30 for analysing the trace information and generating a summary profile of the executed program. The analysing apparatus 30 has processing circuitry 34 which receives the trace information from the interface 32, analyses it, and generates a program profile 36 which is stored to a memory 40 within the analysing apparatus 30. The memory 40 also stores an instruction-by-instruction representation of the target program 42, which corresponds to the program 6 executed by the target data processing apparatus 2. The representation of the target program 42 stored by the analysing apparatus 30 may not be exactly the same, as it could be in an alternative representation (e.g. object code rather than assembly language). The memory 40 also includes a profile cache 44 which is used by the processing circuitry 34 to generate the program profile 36. The profile cache 44 could be stored in a dedicated cache or memory provided in hardware separately from the rest of the memory used to store other information, or could be a data array within the same memory device storing the profile 36 and target program representation 42.

Figure 3:
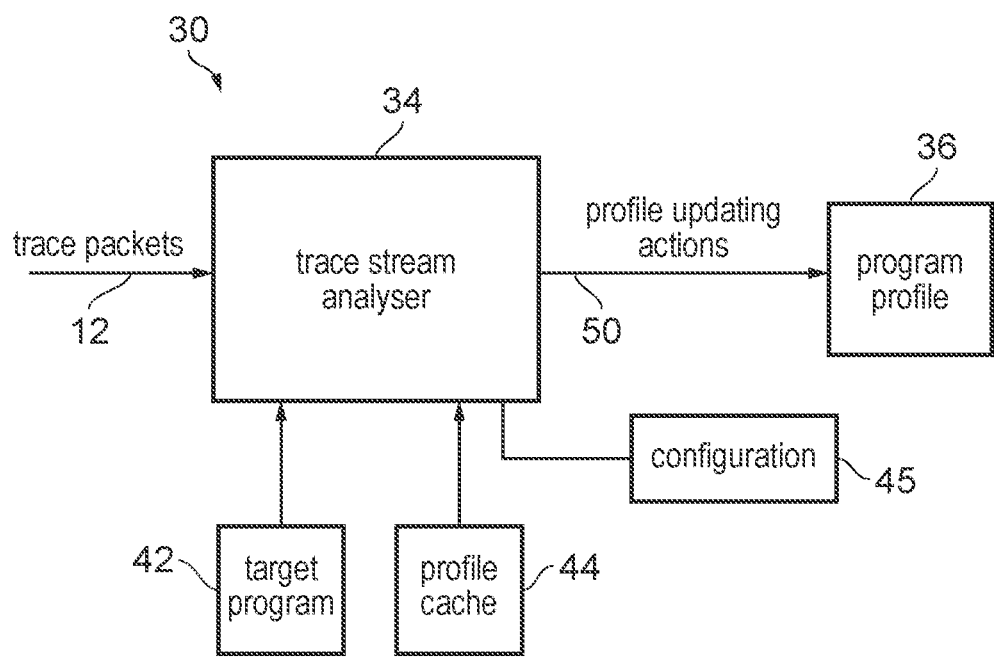
FIG. 3 is an example showing data flow in the trace stream analysing apparatus.

FIG. 3 shows schematically the data flow within the analysing apparatus 30. The processing circuitry 34 acts as a trace stream analyser which receives the trace packets 12 output from the target data processing apparatus 2 via the interface 16, 32. The trace packets 12 include a series of waypoint markers 22 identifying outcomes of corresponding waypoint instructions in the program flow. Based on the waypoint markers the trace stream analyser 34 identifies blocks of instructions which were executed by the target processing apparatus 2 during execution of the target program 6, and then based on the instruction-by-instruction representation of the target program 42 and the profile cache 44, identifies any profile updating actions 50 to be made to the program profile 36 for each block of instructions. Configuration data 45 specifies which kinds of events detected in the corresponding block of executed instructions should trigger corresponding updates to the program profile 36 (e.g. identifying classes of instructions or events to be counted). By repeating this process for each block of instructions executed the program profile 36 is gradually built up to summarise the execution of the program.

The stored program representation 42 represents the static instructions stored in memory. However, the frequency of occurrence of events to be recorded in the profile 36 depends on the dynamic execution of the program. Some static instructions may be executed several times due to a loop as shown in FIG. 2, so in this case each dynamic execution of the same static instruction may need to trigger a corresponding update to the profile 36. Therefore, the waypoint markers of the trace stream 12 are used to identify the route taken through the static instructions of the program representation 42 when the program was actually executed, which may depend on data input to the program for example.

As shown in FIG. 2, the waypoint markers in the trace stream 12 do not themselves identify any information about the instructions which were executed and so one approach is to expand this into a full instruction-by-instruction representation of the dynamically executed instructions, to count occurrences of various events such as execution of certain types of instructions. In the example of FIG. 2, the first waypoint marker 22 is <N> and so this indicates that the first branch instruction 20 at instruction address #36 was not taken. Therefore, the next instruction executed would be the instruction at the following address #40, and a sequence of instructions from addresses #40 to #96 would then be executed up to the next waypoint instruction. Hence, each instruction in this sequence could be decoded and the profile can be updated accordingly based on the decoded instructions.

However, this operation for expanding the trace stream and decoding each instruction is slow as there may be many instructions between successive waypoint instructions. In practice, many of these instructions may not contribute to the profile at all as they may not be types of instructions of interest. The trace stream could be expanded significantly but then discarded.

Also, as shown in FIG. 2 the program may include loops so that a certain block of instructions may be executed several times. Expanding this into individual instructions based on the target program representation 42 and decoding each instruction every time the same sequence of instructions is encountered is expensive and unnecessary. Instead, the profile cache 44 is provided to remember sets of profile related actions triggered by pairs of program flow waypoints to avoid the need to expand each pair into an instruction sequence every time it is seen.

Figure 4:
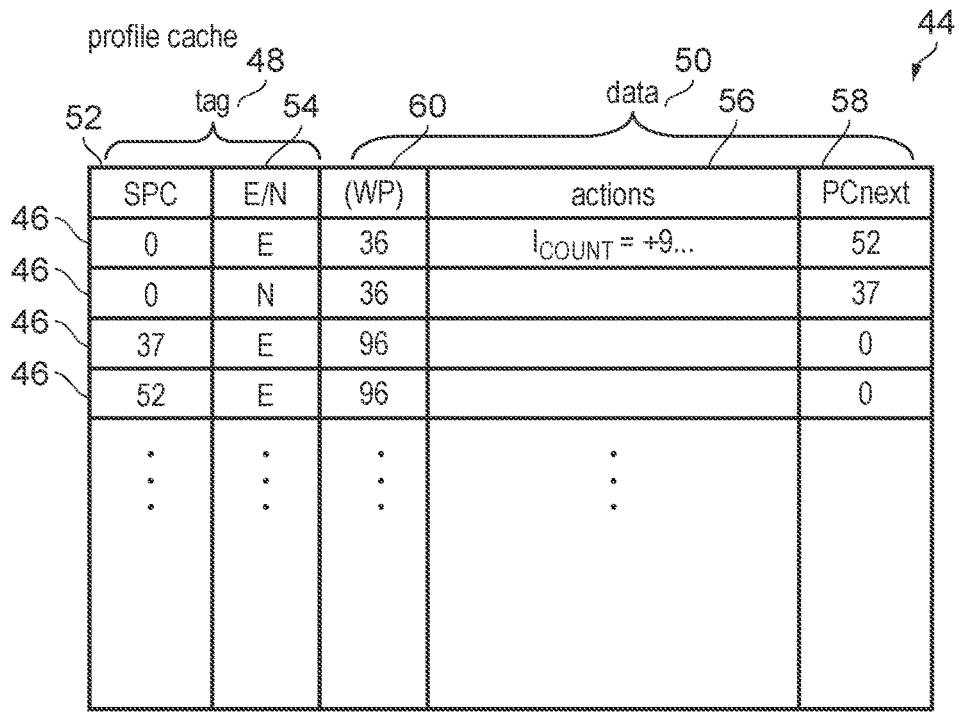
FIG. 4 shows an example of a profile cache.

FIG. 4 shows an example of the profile cache 44. The profile cache 44 includes a number of entries 46 each comprising a tag portion 48 and a data portion 50. Each entry 46 corresponds to a block of instructions starting from a given start address (start program counter) and ending with a waypoint instruction corresponding to one of the waypoint markers in the trace stream.

The tag portion 48 of each entry identifies the start program counter (SPC) 52 and a waypoint result indicator 54 indicating the outcome of the corresponding waypoint instruction.

The data portion 50 of the entry 46 includes an action list defining a set of zero, one or more profile updating actions 56 associated with the corresponding block of instructions. For example, the actions could include incrementing a count of a number of executed instructions of a given type, incrementing an event count tracking the number of occurrence of a given event such as a function call, statement, or exception, or other types of actions for updating the profile to specify some property of the instructions which were executed or a property of the processing circuitry 4 when executing those instructions. For some entries 46 the action list 56 may specify zero actions, so that it identifies that there are no profile updating actions associated with the corresponding block of instructions.

The data portion 50 also includes a next program counter (PCnext) 58 which represents the address of an instruction which was executed by the target data processing apparatus 2 immediately after the waypoint instruction marking the end of the current block of instructions. In general, for a taken waypoint (for which the corresponding result indicator 54 is <E>) the next program counter is the target address of the corresponding waypoint instruction (e.g. a branch target address or function return address). For a not taken waypoint (with a result indicator of <N>), the next program counter 58 indicates an address which is consecutive with the address of the waypoint instruction.

As shown in FIG. 4, optionally the data portion may also include a waypoint address indicator 60 indicating the address of the waypoint instruction which marks the end of the block of instructions, but this is not essential. The waypoint address 60 has been included in FIG. 4 to help understand the blocks of instructions to which each entry corresponds, but in a real implementation the start program counter 52 and the waypoint result indicator 54 are enough to act as a tag for locating the correct entry. The waypoint address 60 may be implicit from the address of the next waypoint instruction following the start address 52, so it may not need to be stored.

Figure 5:
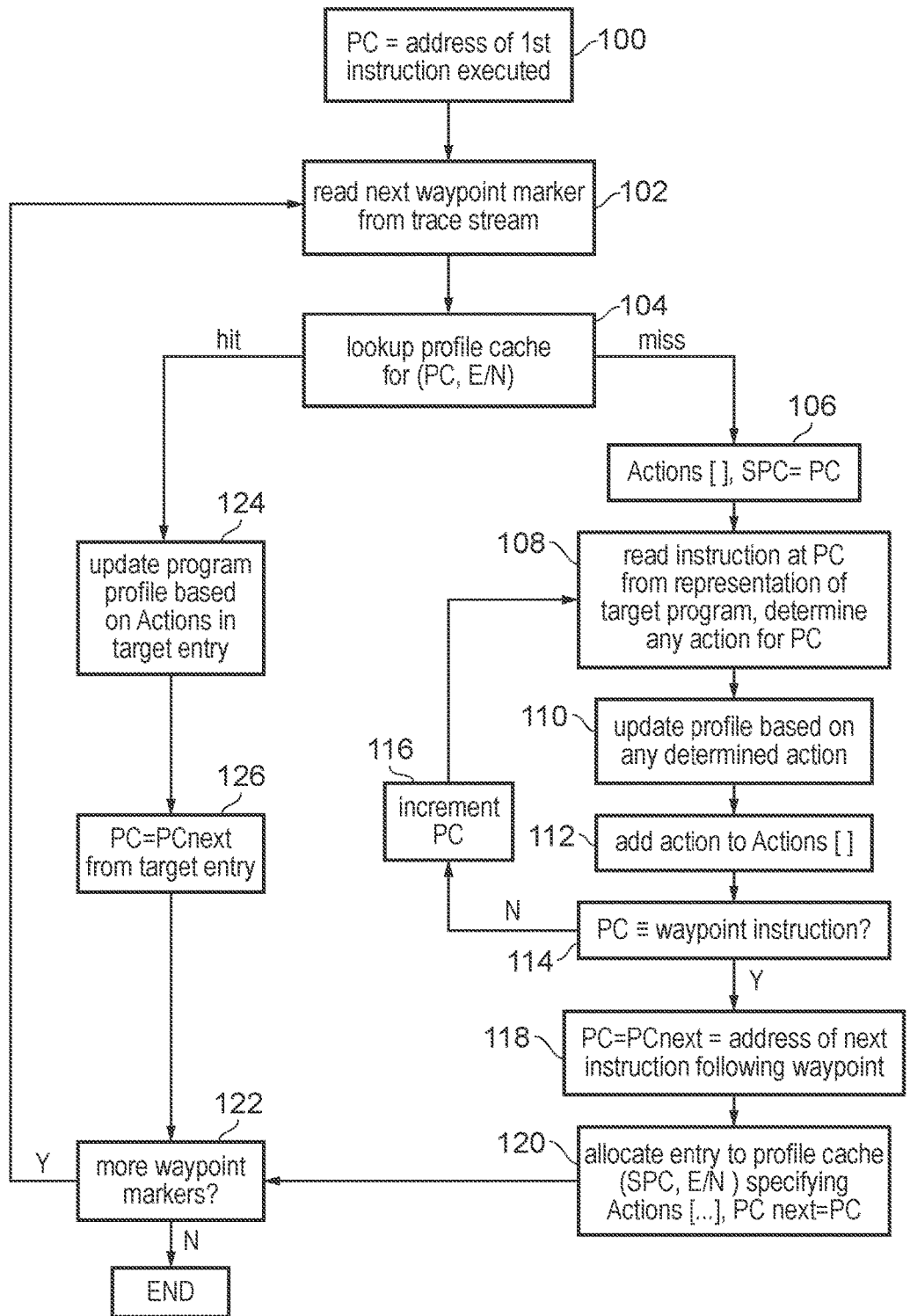
FIG. 5 is a flow diagram illustrating a method of generating a profile of a target program.

FIG. 5 shows a flow diagram explaining a method for generating a target program executed by a target data processing apparatus 2. The method is performed through a series of iterative steps which are referred to as profile updating operations. Each loop around the flow chart of FIG. 5 corresponds to one profile updating operation. Each profile updating operation corresponds to a given block of executed instructions in the program. A current program counter PC is maintained to track the current point of the program for which analysis is being performed.

At step 100 the current program counter PC is set equal to the address of the first instruction executed by the target data processing apparatus when executing the target program 6. For example, in the case of FIG. 2 the address of the first instruction executed is #0.

At step 102 the trace stream analyser 34 reads the next waypoint marker 22 from the trace stream 12. The next waypoint marker is the first waypoint marker in the stream which has not already been considered in a previous profile updating operation. At step 104 the trace stream analyser 34 performs a lookup in the profile cache 44 for an entry with a tag portion 48 matching the current program counter PC and the waypoint outcome of the next waypoint marker read at step 102. If the cache 44 includes an entry whose start address (SPC) 52 matches the current program counter PC and whose waypoint result indicator 54 matches the result indicated by the next waypoint marker from the trace stream, then there is a cache hit and so the target entry corresponding to the current block of instructions is present in the cache. If there is no entry 46 whose start address 52 matches the current program counter PC and whose waypoint result 54 matches the result of the next waypoint marker, then there is a cache miss and the target entry is absent.

In the case of a cache miss, at step 106 an array Actions[ ] is initialised as an empty array, and the current program counter PC is stored as the start program counter SPC for the current block of instructions. At step 108, the trace stream analyser 34 accesses the instruction-by-instruction representation of the target program 42 and reads and decodes the instruction whose address is equal to the current program counter. The trace stream analyser 34 determines whether the decoded instruction requires an update to be made to the program profile 36. For example, based on the configuration data 45, the trace stream analyser 34 may determine whether the decoded instruction meets certain conditions that would require an update to the program profile 36. For example, if the decoded instruction is one of the types of instruction for which counts are being maintained, then this may trigger an increment to that count. For some instructions there may not be any action required. At step 110 the program profile 36 is updated based on any action which was determined at step 108 (if there are no actions determined, then the profile remains the same). Also, at step 112 any determined action is added to the array Actions[ ] which tracks all the profile updating actions determined so far for the current block of instructions.

At step 114 the trace stream analyser 34 determines whether the instruction at the current program counter address PC is a waypoint instruction. If not, then at step 116 the program counter is incremented and then the method returns to step 108 to read and decode the next instruction from the representation of the target program 42. This loop through steps 108 to 116 continues for each successive instruction until eventually a waypoint instruction is reached.

When the current instruction represented by the program counter PC is a waypoint instruction at step 114, then at step 118 the program counter PC is set to the address of the next instruction to be executed following the waypoint. When the next waypoint marker read at step 102 indicated a not taken waypoint <N>, then the program counter PC is incremented to the address of the next instruction. When the next waypoint marker indicated a taken waypoint <E>, the trace stream analyser 34 decodes the waypoint instruction to identify its target address and sets the current program counter PC equal to the determined target address.

At step 120 a new entry is allocated to the profile cache 44 for the block of instructions currently being processed. The entry is stored with a tag portion 48 specifying, as the start address 52, the start program counter SPC which was stored at step 106, and specifying the waypoint result 54 of the next waypoint marker read at step 102. The data portion 50 of the entry specifies as the action list any actions specified in the array Actions [ ] which has been developed by looping through steps 108 to 116 for each instruction in the current block. The data portion also specifies as the next instruction address 58 the current value of the current program counter PC which was determined at step 118 (i.e. the address of the next instruction following the current waypoint instruction).

On the other hand, if there is a cache hit at step 104 then at step 124 the target entry in the profile cache is read and the program profile 36 is updated based on any actions specified in the action list 56 in the target entry 46. If the action list specifies zero actions, then no update is made to the profile 36 for the current block of instructions, while if there are one or more actions specified then these actions are made to update the profile 36. In this way, all the actions required for the whole block of instructions can be made in one go rather than having to step through each instruction of the representation of the target program 42, which is slow. Hence the profile cache can greatly speed up profile updates. At step 126 the current program counter PC is set equal to the next program counter 58 specified in the target entry accessed in the profile cache 104. This means that it is not necessary to decode the waypoint instruction at the end of the current block of instructions since the next program counter is specified in the cache directly, and so there is no need to re-determine the destination of the waypoint. Following step 126 the method proceeds again to step 122.

At step 122 the trace stream analyser 34 determines whether there are any more waypoint markers in the trace stream to be traced, and if so, the method returns to step 102 for the next waypoint marker. If there are no more waypoint markers, then the process can end. In some implementations a waypoint marker may be provided in the trace stream to mark the last instruction in the program and in this case no further steps are necessary. Alternatively, in other implementations the last waypoint marker may not represent the last executed instruction, and if there are some instructions executed beyond the final waypoint then there may need to be one more loop through the method of FIG. 5 to determine the actions required for the final block of instructions following the last waypoint. If there are any more waypoint markers to be considered then following step 122 the method returns to step 102 to read the next waypoint marker.

A worked example of applying the method of FIG. 5 to the example shown in FIG. 2 is shown below. Initially, the profile cache is empty.

$1^{st}$ Profile Updating Operation
current PC=#0, next waypoint=<N>(next block of instructions=#0 to #36)

The lookup in the profile cache for (#0, <N>) misses, so access the instruction-by-instruction representation 42 to determine the required actions (Actions[1]) to be made to the profile and the next instruction address #40. Allocate a new profile cache entry:
Entry 1 [SPC=#0, E/N=<N>, actions=Actions[1], PCnext=#40]
set current PC=#40

$2^{nd}$ Profile Updating Operation
current PC=#40, next waypoint=<E> (next block of instructions=#40 to #96)

The lookup in the profile cache for (#40, <E>) misses, so access the instruction-by-instruction representation 42 to determine the required actions (Actions[2]) to be made to the profile and the next instruction address #0. Allocate a new profile cache entry:
Entry 2 [SPC=#40, E/N=<E>, actions=Actions[2], PCnext=#0]
set current PC=#0

3rd Profile Updating Operation
current PC=#0, next waypoint=<N>

The lookup in the profile cache for (#0, <N>) hits against entry 1, so update the profile 36 based on Actions[1] specified in the entry, and set the PC=PCnext=#40. No need to access the instruction-by-instruction representation.

$4^{th}$ Profile Updating Operation
current PC=#40, next waypoint=<E>

The lookup in the profile cache for (#40, <E>) hits against entry 2, so update the profile 36 based on Actions[2] specified in the entry, and set the PC=PCnext=#0. No need to access the instruction-by-instruction representation.

$5^{th}$ Profile Updating Operation
current PC=#0, next waypoint=<E>

The lookup in the profile cache for (#0, <E>) misses, as the only entry in the cache for address #0 is for a not taken waypoint <N>. Hence, the instruction-by-instruction representation 42 is used to determine the required actions (Actions[3]) to be made to the profile and the next instruction address #52 and a new profile cache entry is allocated:
Entry 3 [SPC=#0, E/N=<E>, actions=Actions[3], PCnext=#52].
set current PC=#52.

$6^{th}$ profile updating operation
current PC=#52, next waypoint=<E>

The lookup in the profile cache for (#52, <E>) misses, so the instruction-by-instruction representation 42 is used to determine the required actions (Actions[4]) to be made to the profile and the next instruction address #0 and a new profile cache entry is allocated:
Entry 4 [SPC=#52, E/N=<E>, actions=Actions[4], PCnext=#0].
set current PC=#0.

$7^{th}$ Profile Updating Operation
same as the $3^{rd}$ profile updating operation.

8th Profile Updating Operation
current PC=#40, next waypoint=<N>

The lookup in the profile cache for (#40, <N>) misses, so the instruction-by-instruction representation 42 is used to determine the required actions (Actions[5]) to be made to the profile and the next instruction address #100 and a new profile cache entry is allocated:
Entry 5 [SPC=#40, E/N=<N>, actions=Actions[5], PCnext=#100).

Any further waypoint markers can then be processed in a similar manner. In this example, the profile cache allowed the required profile updates to be performed without needing to access the instruction-by-instruction representation for the $3^{rd}$, $4^{th}$ and $7^{th}$ profile updating operations, but it will be appreciated that in a real life example there are often many repeated iterations of a loop with the same pattern of waypoint outcomes, so that the profile cache can greatly reduce the number of times the full instruction-by-instruction representation is decoded.

An example of some pseudo code for implementing the method discussed above is as follows:

```
def update_for_waypoint(PC):
    tag = (PC,E)
    if tag in cache:
        (actions, PC) = cache(PC,E)
        for action in actions:
            use action to update profile
    else:
        actions = [ ]
        loop
            retrieve instruction at PC
            retrieve source position / inline-function
            information for instruction
            if profile needs updating:
                update profile based on information about
                this and previous instruction
                add update action to actions
            is instruction a branch?
            if yes, then set PC to destination of
            branch, and break out of loop
            if not, update PC and repeat loop for
            next instruction
        end loop
        cache[tag] = (actions,PC)
```

Figure 6:
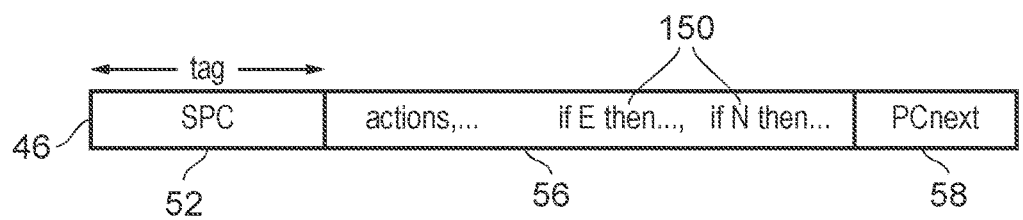
FIG. 6 shows an example of a shared profile cache entry for a given block of instructions with different conditional profile updating actions specified depending on the outcome of at least one waypoint instruction.

The example discussed above allocates separate profile cache entries 46 for a given block of instructions corresponding to different outcomes of the corresponding waypoint instruction for that block. However, as shown in FIG. 6 it is also possible to provide a single shared entry 46 for a given block of instructions starting with the start program counter 52, regardless the outcome of the final waypoint instruction marking the end of the block. This may sometimes be more efficient since creating a combined cache entry for blocks with the same start address ending with taken or not taken waypoints can allow a significant number of actions to be made in common regardless of the outcome since most actions up to the last instruction will often be the same. For example, in the worked example above the entries 1 and 3 could be merged to form a single entry as most of the actions to be taken for instruction block #0 to #36 may be the same regardless of whether the waypoint instruction at address #36 is taken or not taken. As shown in FIG. 6, the action list 56 may specify one or more conditional actions 150 which are to be performed only if the outcome of the corresponding waypoint instruction is taken <E> or not taken <N>. Otherwise, this example may function in a similar way to the earlier example.

Figures 7, 8:
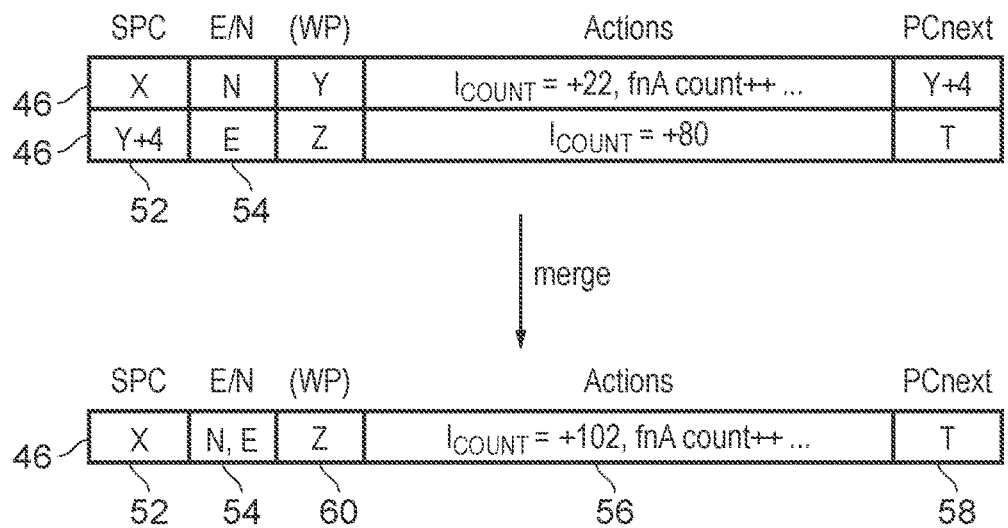
FIG. 7 shows an example of merging profile cache entries.
FIG. 8 shows an example in which a first profile cache entry links to a second profile cache entry for a subsequent block of executed instructions.

In the example of FIG. 4, each entry 46 corresponds to a block of instructions between two successive waypoints, starting with the instruction which follows the previous waypoint and ending with the next waypoint. However, as shown in FIG. 7 it is also possible to merge two or more entries 46 corresponding to successive blocks of instructions to form a single merged entry for multiple blocks of instructions extending across two or more waypoints. It may be relatively common for several blocks of instructions to be executed consecutively on multiple occasions while executing a program. For example, in FIG. 2 the blocks of instructions at addresses #0 to #36 and addresses #40 to #96 may be executed one after the other on several occasions if the outcome of waypoint instruction at address #36 is not taken <N> for several iterations of the loop. Therefore, by combining their profile cache entries into a single merged entry specifying all the actions required for each of those blocks, fewer cache look ups are required, there is more space in the profile cache for other entries and the overall target program 6 can be processed in fewer iterations round the loop of FIG. 5.

For example, the trace analyser may monitor whether a given condition required for merging entries is satisfied, and if so may merge the entries as shown in FIG. 7. For example the condition may be that a second block of instructions was executed following the first block on more than a certain threshold number of occasions. For example a small tracking structure may be maintained by the trace stream analyser 34 to track, for each block of instructions, which other block of instructions was executed next, and when a given block of instructions has the same successor block on more than a threshold number of occasions, then the corresponding entries can be merged.

As shown in FIG. 7, when merging entries the start address 52 of the merged entry takes the same value as the start address of the entry corresponding to the first of the merged blocks of instructions, and the next instruction address 58 takes the same value as the next instruction address 58 of the entry corresponding to the last of the merged blocks of instructions. The action list 56 includes all the actions corresponding to any of the blocks of instructions whose entries are being merged. Note that if two or more entries both specify a given increment to a count value then these may be merged to form a single count update with a larger increment. For example in FIG. 7 two instruction count increments of +22 and +80 are merged to form a single instruction count increment of +102.

Also, the waypoint outcome indicators 54 for each of the merged entries are combined to form a single waypoint outcome indicator 54 which specifies the outcomes of each of the intervening waypoints (e.g. N, E in FIG. 7). There may be a number of ways of encoding a combination of waypoint outcomes within a single entry. In some cases the trace encoding scheme used by the trace module 10 may already have encodings for specifying certain combinations of waypoint results in order to compress a series of program flow markers 22 in a given trace packet, and so the same encoding could be used in the profile cache. This may simplify design of the trace stream analyser 34 if it only needs to consider one encoding scheme when interpreting any given set of waypoint results as represented in the original trace stream or within an entry of the profile cache.

When the system supports merging of two or more entries in this way, then for a given start program counter address there may be two or more different candidate blocks of instructions which may need to be considered. For example, when checking the cache the trace stream analyser 34 may not know whether there will be two separate entries for start program counter addresses X and Y+4 or a single merged entry for both blocks of instructions as shown in FIG. 7. Hence, at steps 102 and 104 of FIG. 5, the trace stream analyser 34 may read waypoint markers from the trace stream corresponding to two or more different candidate blocks of instructions (e.g. blocks extending to the next waypoint instructions, two waypoint instructions further, three waypoint instructions further, etc.) and then lookup the profile cache at step 104 for each of those candidate blocks of instructions to check whether there is a hit.

If the merging approach of FIG. 7 is combined with the approach of FIG. 6 where a single entry is shared for different outcomes of the waypoint instructions, then there may be a list of more than two sets of conditional update operations 150 corresponding to the different outcomes of the two or more waypoint instructions in the following block of instructions that has been merged.

As shown in FIG. 8, in some embodiments at least some of the profile cache entries 46 may include a subsequent entry indicator 160 which identifies which profile cache entry 46 corresponds to a block of instructions executed following the block of instructions corresponding to the current entry. For example, in FIG. 8 the cache entry at index 0 identifies as a subsequent entry index 2, which indicates that the entry at index 2 is for a block of instructions with start program counter Y+4 which matches the next program counter 58 of the entry at index 0. This can help accelerate cache lookup because one entry can chain directly to its successor entry. Hence, if on a given cache access the accessed entry specifies a successor entry 160, then the following profile updating operation can access the specified successor entry directly without needing to perform the full tag comparison of the tag portions 48 of each entry against the current program counter PC and waypoint outcome. Before using the contents of the successor entry, the trace analyser 34 double checks whether the start program counter 52 and waypoint outcome 54 match the current program counter and the current waypoint result from the trace stream, and if so then a hit is determined and any actions recorded in that entry are made to the profile at step 124 as before. If the successor entry does not match the current program counter and current waypoint result from the trace stream, then the trace stream analyser then performs the full tag comparison as in the case where no successor entry is specified in the cache. This is because there may be some iterations of a loop where a different waypoint outcome occurs so that a different block of instructions is executed instead of the block of instructions corresponding to the successor entry. Nevertheless, having entries of the cache chain directly to the next entry can often be useful for accelerating cache lookup. It is not essential for all the entries of the cache to specify a successor entry in the subsequent entry indication 160. Some entries may not chain to a following instruction if the trace stream analyser 34 is not yet determined a repeating pattern of execution for the corresponding block of instructions.

Figure 9:
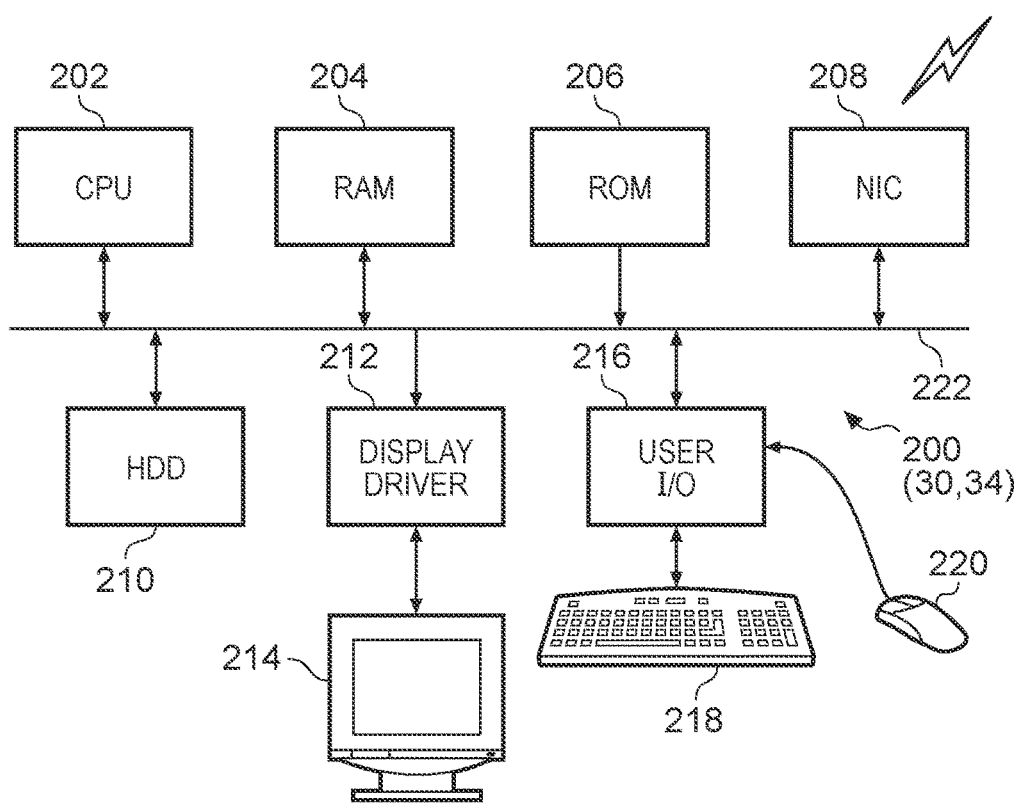
FIG. 9 schematically illustrates an example computer implementation of the analysing apparatus.

FIG. 9 shows an example of a computing system which may be used to implement the trace stream analyser 34 or the analysing apparatus 30. FIG. 9 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 9 is only one example.

Alternatively, the above-described techniques may be implemented in a more distributed fashion, wherein the general purpose computer 200 illustrated in FIG. 9 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations. In some configurations such an infrastructure is termed a 'cloud computing' arrangement.

Figure 10:
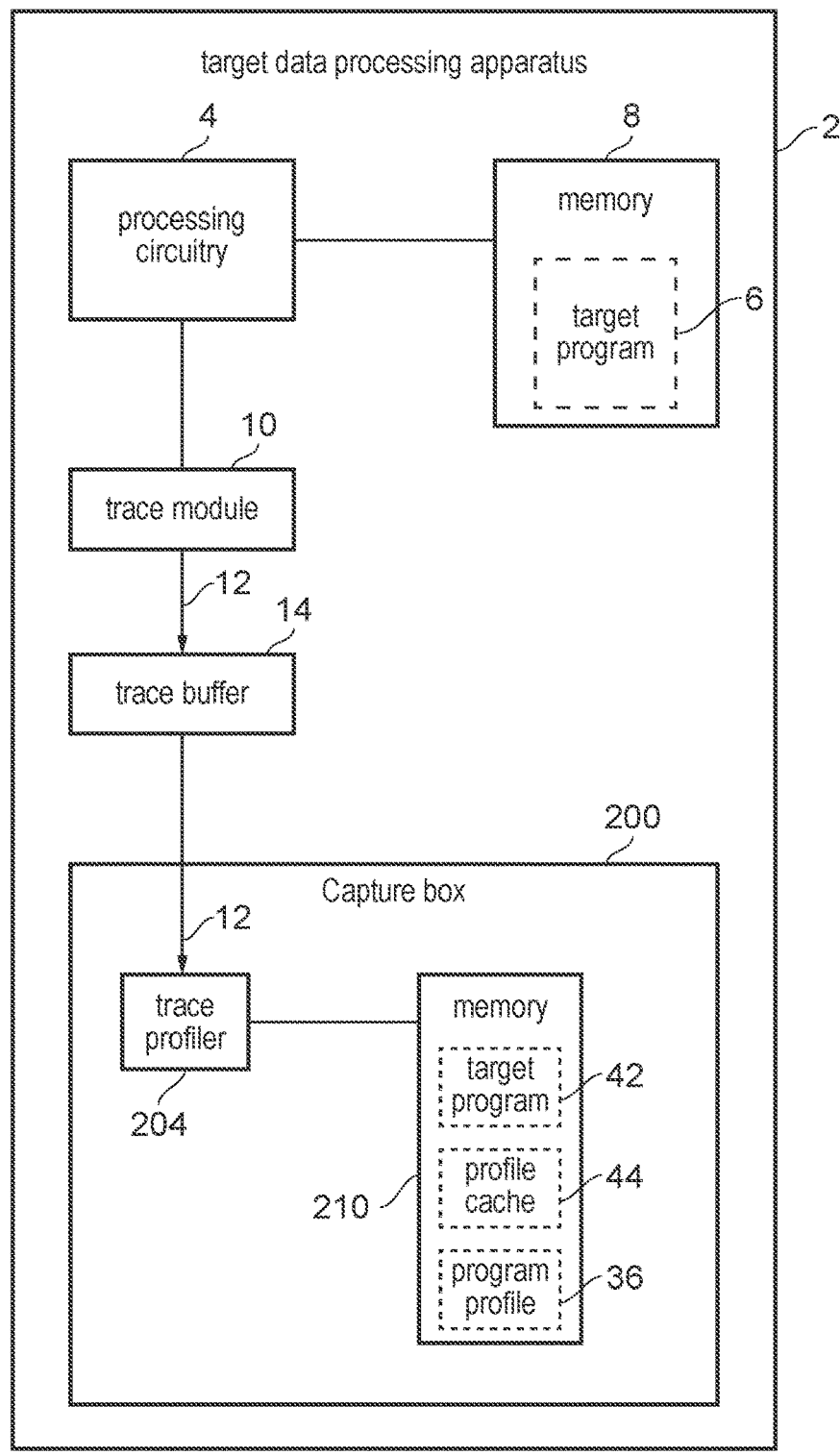
FIG. 10 shows an alternative example in which the target data processing apparatus includes capture box circuitry for analysing the trace data to generate the summary profile of the target program.

FIG. 10 shows an alternative embodiment for generating a program profile 36 for a target program 6 executed by a target data processing apparatus. In this example the program profile 36 is generated by the same target data processing apparatus which executed the target program itself. Again, the target data processing apparatus 2 has processing circuitry 4 for executing the target program 6 stored in memory 8. Trace module 10 is again provided to generate the trace stream and output it to a trace buffer 14 but this time there is not necessarily a trace interface 16 for outputting the trace data to the outside although it could still optionally be provided. A capture box 200 is provided as part of the target data processing apparatus 2 to capture the trace data stored in the trace buffer 14 and analyse it using a trace profiler 204. The captured box has some on chip memory 210 (alternatively it could reuse a portion of the memory 8 used by the processing circuitry 4). The trace profiler 204 analyses the trace packets 12 and generates the program profile 36 using the representation of a target program 42 and the profile cache 44 in the same as discussed above.

This approach can be useful for example for a server or other processing apparatus to analyse the trace data generated based on its own processing, and generate a program profile accordingly. The program profile 36 could then be used to optimise performance of the target data processing apparatus 2, for example by recompiling the target program 6, switching to a different operating mode, or tweaking some control configuration changing how the processing circuitry 4 executes the target program 6.

Some example embodiments are defined in the following clauses:

(1) A method for generating a profile of a target program executed by a target data processing apparatus, based on trace information captured during execution of the target program by the target data processing apparatus;

the method comprising performing at least one profile updating operation, each profile updating operation comprising:

identifying, based on at least one waypoint marker of said trace information indicating an outcome of a corresponding waypoint instruction of the target program, a next block of instructions executed by the target data processing apparatus during execution of the target program;

determining whether a target entry corresponding to said next block of instructions is present in a profile cache, the target entry specifying zero, one or more profile updating actions associated with the next block of instructions; and when the target entry is present in the profile cache, updating the profile of the target program according to said zero, one or more profile updating actions specified by said target entry.

(2) The method of clause (1), wherein when the target entry is absent in the profile cache, the at least one profile updating operation comprises determining zero, one or more profile updating actions for said next block of instructions based on an instruction-by-instruction representation of said target program, and updating the profile of the target program based on said zero, one or more profile updating actions.

(3) The method of clause (2), wherein when the target entry is absent in the profile cache, the at least one profile updating operation comprises allocating an entry to the profile cache specifying said zero, one or more profile updating actions determined for said next block of instructions based on said instruction-by-instruction representation.

(4) The method of any of clauses (1) to (3), wherein each profile updating operation comprises identifying a next waypoint marker of the trace information, wherein the next block of instructions comprises a block of instructions ending with a next waypoint instruction corresponding to the next waypoint marker.

(5) The method of any of clauses (1) to (4), wherein each entry of the profile cache corresponds to a block of instructions ending with a corresponding waypoint instruction, and identifies a next instruction address of the next instruction executed by the data processing apparatus following the corresponding waypoint instruction.

(6) The method of clause (5), wherein when the target entry is present in the profile cache for a given profile updating operation, for a subsequent profile updating operation the next block of instructions starts with an instruction having the next instruction address indicated by the target entry for said given profile updating operation.

(7) The method of any of clauses (5) and (6), wherein when the target entry is absent for the given profile updating operation, the next block of instructions starts with an instruction having an instruction address determined based on the instruction-by-instruction representation.

(8) The method of any of clauses (1) to (7), wherein the waypoint instruction comprises a branch instruction or function return, and each waypoint marker indicates the outcome for a corresponding waypoint instruction as one of taken and not taken.

(9) The method of any of clauses (1) to (8), wherein each entry of the profile cache corresponds to a block of instructions comprising at least one waypoint instruction, and identifies the outcome for said at least one waypoint instruction; and the target entry is determined to be present in the profile cache when an entry of the profile cache corresponds to the same block of instructions as said next block of instructions and identifies the same outcome as at least one waypoint marker for said at least one waypoint instruction.

(10) The method of any of clauses (1) to (8), wherein each entry of the profile cache corresponds to a block of instructions ending with a corresponding waypoint instruction; and the target entry is determined to be present in the profile cache when an entry of the profile cache corresponds to the same block of instructions as said next block of instructions, irrespective of the outcome indicated by the waypoint marker for the corresponding waypoint instruction.

(11) The method of claim (10), wherein the target entry specifies at least one conditional profile updating action to be performed selectively depending on the outcome indicated by the waypoint marker for the corresponding waypoint instruction.

(12) The method of any of clauses (1) to (11), wherein each entry of the profile cache identifies a start address of the corresponding block of instructions; and the determining step comprises performing, for at least one entry of the profile cache, an address comparison for determining whether the start address identified by that entry matches the start address of the next block of instructions.

(13) The method of clause (12), wherein at least one entry of the profile cache corresponding to a first block of instructions comprises a subsequent entry indication identifying a further entry of the profile cache corresponding to a second block of instructions executed by the data processing apparatus following the first block of instructions; and when, for a given profile updating operation, the target entry is present in the profile cache and comprises said subsequent entry indication, for a subsequent profile updating operation the determining step comprises performing the address comparison for said further entry indicated by said subsequent entry indication, and suppressing the address comparison for at least one other entry of the profile cache when the address comparison for said further entry determines that the start address identified by the further entry matches the start address of the next block of instructions.

(14) The method of any of clauses (1) to (13), wherein when a predetermined condition is satisfied, at least two entries of the profile cache are merged to form a single entry of the profile cache specifying profile updating actions to be performed for each of the at least two blocks of instructions corresponding to said at least two entries.

(15) The method of clause (14), wherein the predetermined condition comprises detecting that a number of times when said at least two blocks of instructions are executed consecutively during execution of said target program is greater than a predetermined threshold.

(16) The method of any of clauses (14) and (15), wherein the identifying step comprises identifying at least two candidate blocks of instructions as the next block of instructions, and the determining step comprises determining whether the target entry is present in the profile cache for each of said at least two candidate blocks of instructions.

(17). The method of any of clauses (1) to (16), wherein when the target entry specifies at least one profile updating action associated with the next block of instructions, said at least one profile updating action comprises at least one of:

updating the profile of the target program to indicate at least one property of an executed instruction;

updating at least one count value indicating a number of occurrences of at least one predetermined event;

updating an instruction count value indicating a number of instructions of a predetermined type executed in the next block of instructions; and updating the profile based on a result of processing the corresponding block of instructions with a prediction model.

(18) A computer program which, when executed by a host data processing apparatus, controls the host data processing apparatus to perform the method of any of clauses (1) to (17).

(19) A computer-readable storage medium storing the computer program of clause (18).

(20) An apparatus comprising:

trace receiving circuitry to receive trace information captured during execution of a target program by a target data processing apparatus; and profile generating circuitry to generate a profile of the target program by performing at least one profile updating operation, each profile updating operation comprising:

identifying, based on at least one waypoint marker of the trace information indicating an outcome of a corresponding waypoint instruction of the target program, a next block of instructions executed by the data processing apparatus during execution of the target program;

determining whether a target entry corresponding to said next block of instructions is present in a profile cache, the target entry specifying zero, one or more profile updating actions associated with the next block of instructions;

when the target entry is present in the profile cache, updating the profile of the target program according to said zero, one or more profile updating actions specified by said target entry; and when the target entry is absent in the profile cache, updating the profile of the target program based on zero, one or more profile updating actions determined for said next block of instructions based on an instruction-by-instruction representation of said target program.

(21) An apparatus according to clause (20), wherein the apparatus comprises the target data processing apparatus itself.

(22) An apparatus comprising:

means for receiving trace information captured during execution of a target program by a target data processing apparatus; and means for generating a profile of the target program by performing at least one profile updating operation, each profile updating operation comprising:

identifying, based on at least one waypoint marker of said trace information indicating an outcome of a corresponding waypoint instruction of the target program, a next block of instructions executed by the data processing apparatus during execution of the target program;

determining whether a target entry corresponding to said next block of instructions is present in a profile cache, the target entry specifying zero, one or more profile updating actions associated with the next block of instructions; and when the target entry is present in the profile cache, updating the profile of the target program according to said zero, one or more profile updating actions specified by said target entry.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method for generating a profile of a target program executed by a target data processing apparatus, based on trace information captured during execution of the target program by the target data processing apparatus;

the method comprising performing at least one profile updating operation, each profile updating operation comprising:

identifying, based on at least one waypoint marker of said trace information indicating an outcome of a corresponding waypoint instruction of the target program, a next block of instructions executed by the target data processing apparatus during execution of the target program, wherein the waypoint instruction comprises an instruction having a plurality of alternative outcomes which affect which instructions are executed in the target program following the waypoint instruction;

determining whether a target entry corresponding to said next block of instructions is present in a profile cache, the target entry specifying zero, one or more profile updating actions associated with the next block of instructions;

when the target entry is present in the profile cache, updating the profile of the target program according to said zero, one or more profile updating actions specified by said target entry; and when the target entry is absent in the profile cache, the at least one profile updating operation comprises determining zero, one or more profile updating actions for said next block of instructions based on an instruction-by-instruction representation of said target program, and updating the profile of the target program based on said zero, one or more profile updating actions determined based on the instruction-by-instruction representation.

2. The method of claim 1, wherein when the target entry is absent in the profile cache, the at least one profile updating operation comprises allocating an entry to the profile cache specifying said zero, one or more profile updating actions determined for said next block of instructions based on said instruction-by-instruction representation.

3. The method of claim 1, wherein each profile updating operation comprises identifying a next waypoint marker of the trace information, wherein the next block of instructions comprises a block of instructions ending with a next waypoint instruction corresponding to the next waypoint marker.

4. The method of claim 1, wherein each entry of the profile cache corresponds to a block of instructions ending with a corresponding waypoint instruction, and identifies a next instruction address of the next instruction executed by the data processing apparatus following the corresponding waypoint instruction.

5. The method of claim 4, wherein when the target entry is present in the profile cache for a given profile updating operation, for a subsequent profile updating operation the next block of instructions starts with an instruction having the next instruction address indicated by the target entry for said given profile updating operation.

6. The method of claim 4, wherein when the target entry is absent for the given profile updating operation, the next block of instructions starts with an instruction having an instruction address determined based on the instruction-by-instruction representation.

7. The method of claim 1, wherein the waypoint instruction comprises a branch instruction or function return, and each waypoint marker indicates the outcome for a corresponding waypoint instruction as one of taken and not taken.

8. The method of claim 1, wherein each entry of the profile cache corresponds to a block of instructions comprising at least one waypoint instruction, and identifies the outcome for said at least one waypoint instruction; and the target entry is determined to be present in the profile cache when an entry of the profile cache corresponds to the same block of instructions as said next block of instructions and identifies the same outcome as at least one waypoint marker for said at least one waypoint instruction.

9. The method of claim 1, wherein each entry of the profile cache corresponds to a block of instructions ending with a corresponding waypoint instruction; and the target entry is determined to be present in the profile cache when an entry of the profile cache corresponds to the same block of instructions as said next block of instructions, irrespective of the outcome indicated by the waypoint marker for the corresponding waypoint instruction.

10. The method of claim 9, wherein the target entry specifies at least one conditional profile updating action to be performed selectively depending on the outcome indicated by the waypoint marker for the corresponding waypoint instruction.

11. The method of claim 1, wherein each entry of the profile cache identifies a start address of the corresponding block of instructions; and the determining step comprises performing, for at least one entry of the profile cache, an address comparison for determining whether the start address identified by that entry matches the start address of the next block of instructions.

12. The method of claim 11, wherein at least one entry of the profile cache corresponding to a first block of instructions comprises a subsequent entry indication identifying a further entry of the profile cache corresponding to a second block of instructions executed by the data processing apparatus following the first block of instructions; and when, for a given profile updating operation, the target entry is present in the profile cache and comprises said subsequent entry indication, for a subsequent profile updating operation the determining step comprises performing the address comparison for said further entry indicated by said subsequent entry indication, and suppressing the address comparison for at least one other entry of the profile cache when the address comparison for said further entry determines that the start address identified by the further entry matches the start address of the next block of instructions.

13. The method of claim 1, wherein when a predetermined condition is satisfied, at least two entries of the profile cache are merged to form a single entry of the profile cache specifying profile updating actions to be performed for each of the at least two blocks of instructions corresponding to said at least two entries.

14. The method of claim 13, wherein the predetermined condition comprises detecting that a number of times when said at least two blocks of instructions are executed consecutively during execution of said target program is greater than a predetermined threshold.

15. The method of claim 13, wherein the identifying step comprises identifying at least two candidate blocks of instructions as the next block of instructions, and the determining step comprises determining whether the target entry is present in the profile cache for each of said at least two candidate blocks of instructions.

16. The method of claim 1, wherein when the target entry specifies at least one profile updating action associated with the next block of instructions, said at least one profile updating action comprises at least one of:
    updating the profile of the target program to indicate at least one property of an executed instruction;
    updating at least one count value indicating a number of occurrences of at least one predetermined event;
    updating an instruction count value indicating a number of instructions of a predetermined type executed in the next block of instructions; and
    updating the profile based on a result of processing the corresponding block of instructions with a prediction model.

17. A non-transitory computer-readable storage medium storing a computer program which, when executed by a host data processing apparatus, controls the host data processing apparatus to perform the method of claim 1.

18. An apparatus comprising:
    trace receiving circuitry to receive trace information captured during execution of a target program by a target data processing apparatus; and
    profile generating circuitry to generate a profile of the target program by performing at least one profile updating operation, each profile updating operation comprising:
    identifying, based on at least one waypoint marker of said trace information indicating an outcome of a corresponding waypoint instruction of the target program, a next block of instructions executed by the data processing apparatus during execution of the target program, wherein the waypoint instruction comprises an instruction having a plurality of alternative outcomes which affect which instructions are executed in the target program following the waypoint instruction;
    determining whether a target entry corresponding to said next block of instructions is present in a profile cache, the target entry specifying zero, one or more profile updating actions associated with the next block of instructions;
    when the target entry is present in the profile cache, updating the profile of the target program according to said zero, one or more profile updating actions specified by said target entry; and
    when the target entry is absent in the profile cache, determining zero, one or more profile updating actions for said next block of instructions based on an instruction-by-instruction representation of said target program, and updating the profile of the target program based on said zero, one or more profile updating actions determined based on the instruction-by-instruction representation.

19. An apparatus according to claim 18, wherein the apparatus comprises the target data processing apparatus itself.

* * * * *